United States Patent [19]
Zayhowski

[11] Patent Number: 5,172,391
[45] Date of Patent: Dec. 15, 1992

[54] POLARIZATION CONTROLLING SYSTEM FOR LASERS

[75] Inventor: John J. Zayhowski, Pepperell, Mass.

[73] Assignee: Massachusetts Institute of Technology, Cambridge, Mass.

[21] Appl. No.: 639,667

[22] Filed: Jan. 9, 1991

[51] Int. Cl.$^5$ .......................................... H01S 3/10
[52] U.S. Cl. ...................................... 372/106; 372/19; 372/27; 372/32; 372/105
[58] Field of Search ................ 372/19, 27, 32, 92, 372/99, 105, 106

[56] References Cited

U.S. PATENT DOCUMENTS

| | | | |
|---|---|---|---|
| 3,546,620 | 12/1970 | Erickson et al. | 359/579 |
| 4,573,156 | 2/1986 | Anthony et al. | 372/19 |
| 4,680,767 | 7/1987 | Hakimi et al. | 372/12 |
| 4,797,893 | 1/1989 | Dixon | 372/19 |
| 4,870,649 | 9/1989 | Bobeck et al. | 372/19 |

OTHER PUBLICATIONS

Whitbourn et al., "Polarization Switching In A Strip Grating Coupled Optically Pumped Submillimeter Laser", *Appl. Phys. Lett.*, 48(15): 957–959, (1986).
Ci-Ling Pan and P.-Y. Jean, "Stabilization of Internal-Mirror He–Ne Lasers", *Applied Optics*, 25(13):2126–2129, (1986).
J. J. Zayhowski et al., "Microchip Lasers", *Optical Society of America Proceedings on Tunable Solid State Lasers*, vol. 5: 288–294, (1989).
J. J. Zayhowski et al., "Frequency-Modulated Nd:YAG Microchip Lasers", *Optical Society of America—Optics Letters*, 14(12): 618–620, (1989).
Adelbert Owyoung et al., "Stress Induced Tuning of a Diode-Laser-Excited Monolithic Nd:YAG Laser", *Optical Society of America—Optics Letters*, 12(12): 999–1001, (1987).
Rochefort et al., "Multiple Line and Polarization Control In A Far Infrared Laser With A Compound Grating Resonator", *Applied Optics*, 30(9):1019–1024, (1991).

*Primary Examiner*—James W. Davie
*Attorney, Agent, or Firm*—Hamilton, Brook, Smith & Reynolds

[57] ABSTRACT

A system for controlling the polarization of lasers is described in which the polarization of laser radiation generated in a gain cavity is controlled by feedback of a controlled amount of polarized light from a polarizing cavity. The output mirror of the gain cavity forms an input mirror of the polarizing cavity.

64 Claims, 2 Drawing Sheets

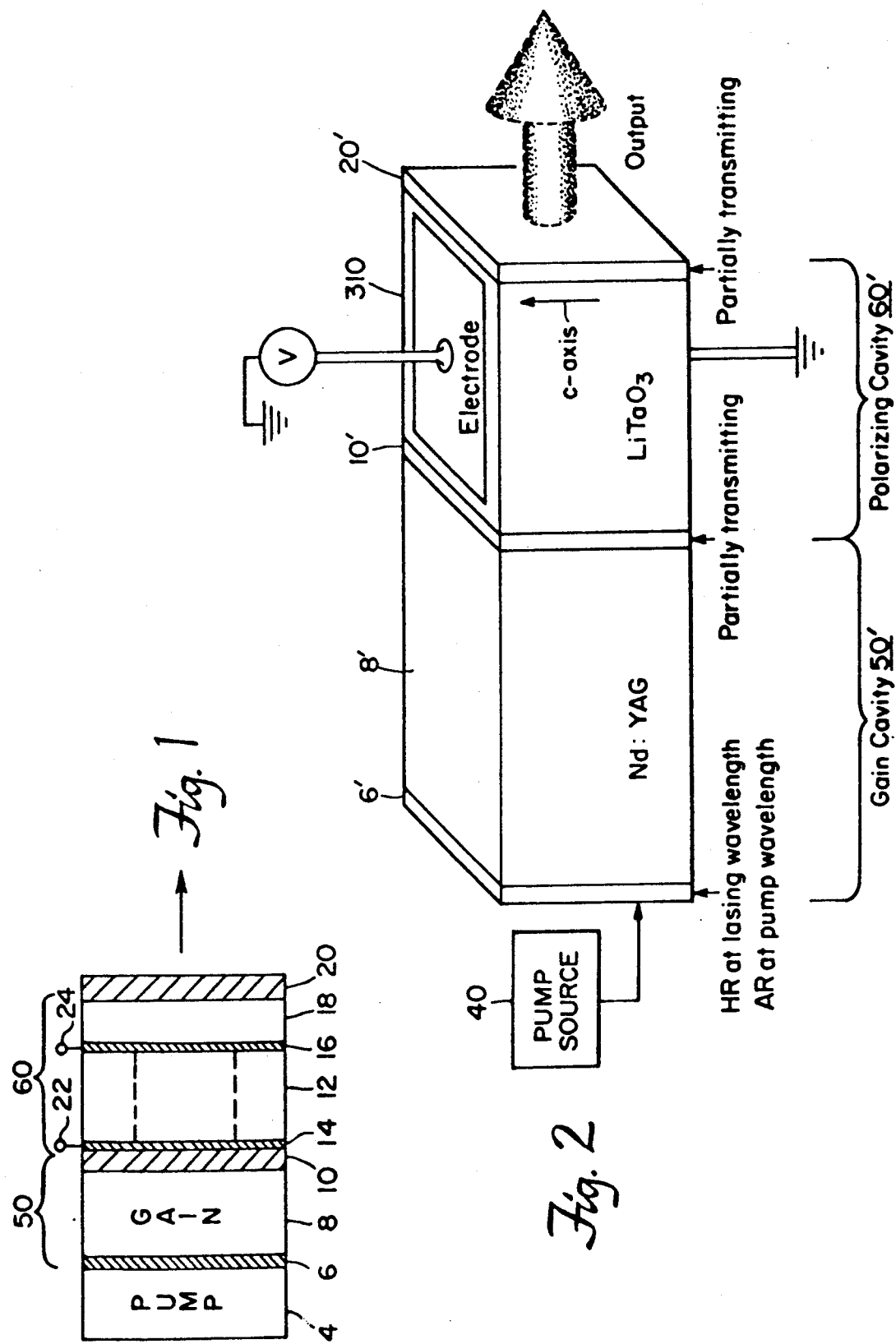

POLARIZATION CONTROLLING SYSTEM FOR LASERS

GOVERNMENT SUPPORT

The Government has rights to this invention pursuant to Contract Number F19628-90-C-0002 awarded by the Department of the Air Force.

BACKGROUND OF THE INVENTION

This invention relates generally to lasers, and more particularly to optically pumped solid state lasers.

A large number of different kinds of solid state lasers have been discovered, distinguished from one another by host material, by active lasing ions with which the host is doped, and by output characteristics. (See U.S. Pat. No. 4,872,177 issued Oct. 3, 1989 and U.S. 4,860,304 to Mooradian issued Aug. 22, 1989).

Solid state optically pumped lasers comprise, in general, a solid state lasing material sometimes called the gain medium which is disposed within an optical cavity formed between two mirrors. An optical source, such as a laser diode or array of diodes, generates a pump beam which is focused onto the lasing material. Photon energy from the pump laser is absorbed by the gain medium. When a threshold level of absorbed light is achieved stimulated emission of light from the gain medium occurs. In the microchip laser of Mooradian the cavity length, or separation between mirrors, may be as small as 10 to 100 microns to obtain the desirable property that the resulting light oscillates in a single axial mode within the laser cavity.

However, in such microchip lasers and in many conventional lasers it is possible to obtain oscillation in two different polarization modes.

Polarization relates to the direction of the electric field vector $\bar{E}$ of a light wave. This vector is perpendicular both to the propagation vector $\bar{k}$ which describes the direction of travel of the wave and to the instantaneous direction of the magnetic field of the wave, $\bar{H}$. The direction of the electric field vector is referred to as the "direction of polarization". Randomly polarized light, i.e. light from incandescent lamps, is unoriented and hence unpolarized, whereas light from lasers is generally highly oriented and hence "polarized".

In many lasers, including microchip lasers, two orthogonally polarized modes are present and have nearly the same threshold. This is due to the fact that a 90 degree rotation of a light wave about its propagation vector results in an optical field orthogonal to the original wave which sees the same amount of net gain (gain minus loss). As a result, the laser may oscillate in both polarizations, or may switch polarizations in response to a small amount of feedback provided by optics external to the laser cavity. One way of controlling the polarization of a laser is to introduce a polarizing element within the cavity, such as a Brewster's angle window. While this is a viable alternative for large lasers, it is not an acceptable solution for microchip lasers, which rely on a short cavity length to perform properly. Conventional polarizing elements made to be compact, flat, and thin for microchip applications are often too lossy to use intracavity.

The present invention provides a way of selecting the polarization of a laser without the use of intracavity polarizing elements. In addition it provides a method and apparatus for controllably switching a laser between two orthogonal polarizations. Polarization control of lasers is important because many optical systems (including systems with birefringent elements, gratings, optical surfaces which are not normal to the propagation vector of the light, nonlinear optical elements, or polarizing elements) have different properties for different polarizations of light. By switching a laser between orthoganal polarizations information can be encoded on the output light beam.

SUMMARY OF THE INVENTION

The invention comprises a polarization controlled laser formed by a gain cavity coupled to a polarizing cavity. The gain cavity is comprised of a laser gain medium disposed in a cavity formed between a pair of mirrors. Note: The term "mirror" is used herein, in a general sense, to include any surface which is partly, or highly, reflective at a particular wavelength. One of the mirrors is an input mirror for the gain cavity and is disposed adjacent to a pump source. The input mirror is highly reflective at the lasing wavelength of the gain medium and antireflective at the pump wavelength. The second, or more remote mirror from the pump, is partially transmitting and forms a first partial reflector for a polarizing cavity which is comprised of the first partial reflector, a spacer, a polarizing element or a birefringent element (which has a different refractive index for the two orthoganal polarizations), and a second partial reflector, assembled in that order. The first partial reflector provides the dominant part of the reflective feedback seen by the laser gain medium. The small amount of feedback provided by the second partial reflector is polarization dependent, however. The spacer is an optical element which has a variable optical length (physical length times refractive index). The optical length of the spacer determines whether the feedback from the second partial reflector in a given polarization is in phase or out of phase with the light reflected by the first partial reflector. By controlling the optical length of the spacer (electro-optically or piezo-electrically, for example) the reflected light from the second partial reflector in a given polarization can be made to add constructively or destructively to the light reflected by the first partial reflector.

The reflectivity of the second partial reflector is chosen to provide sufficient feedback to split the degeneracy of the two orthogonally polarized laser modes of the gain cavity, and to overcome the effects of feedback from the external optics. The polarization of the laser gain cavity that sees the highest net reflectivity from the two partially reflecting mirrors will experience the most net gain. As a result, it will be the first polarization mode to oscillate, and will deplete the gain for the orthogonally polarized mode. In this way, the polarization of the laser gain cavity is controlled by the polarizing cavity.

BRIEF DESCRIPTION OF THE DRAWINGS

FIG. 1 is a schematic drawing of a laser in accordance with a first embodiment of the invention FIG. 2 is a schematic drawing of a laser according to an alternative embodiment of the invention.

DETAILED DESCRIPTION OF THE INVENTION

Figure 3:
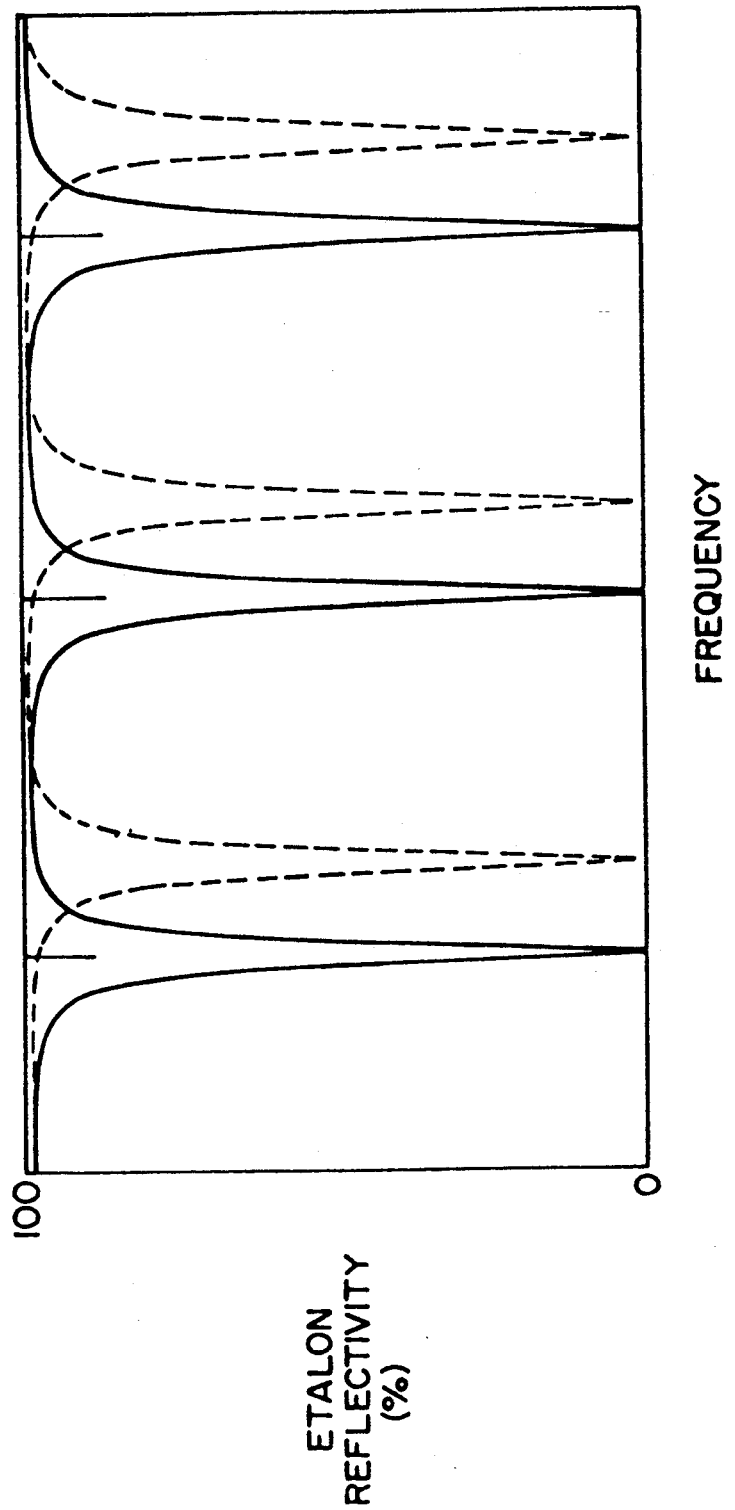
FIG. 3 is a plot of the reflectivity of the polarizing cavity for two orthogonally polarized light waves (solid and dashed lines) versus frequency.

The first embodiment of the invention will be described in connection with FIG. 1. Note that while this embodiment is illustrated in connection with a solid state laser, any suitable laser will benefit from the polarization control and switching capabilities of the invention.

The polarization controlled laser system of the invention comprises, in general, a pump source 4, a gain cavity 50 and a polarizing cavity 60. Pump source 4 may comprise any power source able to bring the gain medium 8 in cavity 50 to a level at which stimulated light emission occurs. Preferably source 4 is a diode laser or the like. Source 4 may be physically adjacent to input mirror 6 of cavity 60, as shown, or light from the source may be collimated and focused onto the gain medium by suitable lens elements (not shown).

Gain cavity 50 is comprised of input mirror 6, gain medium 8 and partial reflector 10.

Input mirror 6 is highly reflective to light at the wavelength of the laser emission from cavity 50 and antireflective at the wavelength of the light from pump 4. Mirror 6 may comprise a dielectric coating deposited on the gain medium 8 or on a thin glass sheet bonded to the medium or other suitable reflector.

The gain medium 8 is preferably a solid state material, such as Nd:YAG or Nd pentaphosphate or the like. The polarizing cavity 60 is comprised in general of a partial reflector or mirror 10, variable optical length spacer or element 12, thin polarizer 18 and output mirror 20. Partial reflector 10 is positioned adjacent to spacer 12. The spacer 12 is preferably transparent to the laser radiation from cavity 50. The first partial reflector 10 may also be formed by a dielectric coating on the spacer 12. The transparent spacer 12 may be an electro-optic material (such as $LiTaO_3$ or GaAlAs) in which the refractive index can be controlled electrically, or a transparent piezoelectric material (such as PLZT or Quartz) in which the length of the spacer can be controlled electrically. In either case, the spacer 12 is processed so as to be conductive along the surfaces 14 and 16 while being insulating in the bulk. The conductive surfaces 14 and 16 may be produced through the deposition of a transparent, conductive material (such as Indium Tin Oxide) on the surface of the spacer 12. Alternatively, the spacer 12 may be a semiconducting material (as in the case of GaAlAs or Si), in which case the conductive layers 14 and 16 could be produced by growing thin conductive semiconductor layers on both sides of an insulating substrate.

A thin polarizer 18 is attached to the side of the spacer 12 remote from the first partial reflector 10. The polarizing cavity is completed by attaching a second partial reflector, or mirror, 20 to the free side of the polarizer 18. The second partial reflector 20 may also be formed by dielectric deposition directly onto the polarizer 18. The optical length of the spacer 12 in the polarizing cavity 60 is controlled through the application of a voltage (not shown) between contacts 22 and 24 formed on the conductive surfaces 14 and 16 of the spacer 12.

The polarizing cavity 60 can be used as the output coupler of a laser. The first partial reflector 10 faces the laser gain cavity 50, and provides the dominate part of the reflectivity seen by the laser gain cavity 50. The small amount of feedback provided by the second partial reflector 20 is polarized, however. The reflectivity of the second partial reflector 20 is chosen to provide sufficient polarized feedback to split the polarization degeneracy of the two orthogonally polarized laser modes, and overcome the effects of feedback from external optics. The optical length of the spacer 12 (physical length times refractive index) determines whether the polarized feedback from the second partial reflector 20 is in phase or out of phase with the light reflected by the first partial reflector 10. By controlling the optical length of the spacer 12, the polarized component of the reflected light can be made to add constructively or destructively to the light reflected by the first partial reflector 10, and the polarization of the laser can be controlled. Note that the polarizer 18 may be placed anywhere between the first partial reflector 10 and the second partial reflector 20. Note also that if a reflective polarizing element (a material which reflects one polarization and transmits the other) is used the second partial reflector 20 may not be required. If the polarizer 18 is strongly reflecting (a very good reflective polarizer) it may be appropriate to use the polarizing cavity as an end mirror of a laser cavity with a different output coupler.

In a variation on the above described embodiment the spacer 12 may comprise a piezoelectric material which is not transparent to the laser radiation. In this option a hole 210 (shown by the dotted lines in FIG. 1) is cut in the spacer 12 and the conductive surfaces 14 and 16 to provide a via for the laser radiation. In this case the conductive surfaces 14 and 16 need not be transparent. Alternatively, with an appropriate spacer material, such as a material with a transverse piezoelectric or electro-optic effect, the conductive surfaces 14 and 16 may be deposited on surfaces of the spacer 12 parallel to the cavity axis, in which case they need not be transparent.

In another embodiment of the invention, as shown in FIG. 2, a piezoelectric or electro-optic birefringent element 310 is placed between two partially reflecting mirrors 10' and 20' so that the net reflectivity of the etalon formed by the two partially reflecting mirrors is different for the two orthogonal polarizations of the laser as a result of the coherent addition of the light reflected by the two partial reflectors. Note that elements with counterparts in FIG. 1 contain the same numeral designation with a prime suffix and need not be described further herein. The optical length of the birefringent element 310 may be changed piezoelectrically or electro-optically (for one or both polarizations) in order to change the phase relationship between the light reflected by the two partial reflectors and thereby control the polarization of the laser.

In yet another embodiment the polarizing cavity may be formed by a partially reflecting mirror, a spacer, a birefringent element and a second partially reflecting mirror in such a way that the optical length of the spacer is changed to control the net reflectivity of the composite mirror in the two orthogonal polarizations. In this embodiment the piezoelectric or electro-optic element of the previous embodiments is replaced by two elements, a spacer having a controllable optical length and a birefringent element.

Any of the above embodiments can be used with a laser that supports several longitudinal cavity modes that are equally spaced, or spaced by multiples of a common frequency. In such a case the free spectral range of the etalon formed by the two partially reflecting surfaces should be approximately equal to the cavity mode spacing, or said common frequency, as illustrated in FIG. 3 which shows the reflectivity of a birefringent etalon in two orthogonal polarizations (solid and dashed lines), where the length of the etalon was chosen so that the net reflectivity of the etalon is low for one of the polarizations (the solid line) and high for the other (the dashed line), at all the potential lasing frequencies of a laser (indicated by the large vertical tic marks at the top of the figure). The polarization of the resulting laser structure can be switched by moving either the resonant transmission frequencies of the polarizing cavity (for one or both of the orthogonal polarizations) or by changing the frequencies of the longitudinal modes of the laser.

EQUIVALENTS

Having shown a number of embodiments, those skilled in the art will realize many variations are possible which will still be within the scope and spirit of the claimed invention. Therefore it is the intention to limit the invention only as indicated by the scope of the claims and equivalents thereof.

I claim:
1. A polarization controlled laser comprising:
   a) a gain cavity for producing laser radiation comprised of first and second mirrors with a gain medium disposed between said mirrors and wherein the laser radiation propagates in a longitudinal mode comprised of degenerate orthogonal polarization modes which compete with each other for gain;
   b) a source for pumping the gain medium to produce said laser radiation;
   c) a polarizing cavity comprised of said second mirror and a third partially reflecting mirror with a spacer of controllable optical length disposed between said second and third mirrors and wherein reflections of laser radiation from said second and third mirrors back to said gain cavity results in a larger net reflectivity of one of said polarization modes than the other, which net reflectivity is controlled by the optical length of said spacer; such that the polarization mode of the higher reflectivity oscillates first thereby depleting the gain for said other polarization mode.

2. The laser of claim 1 wherein the reflectivity of the third mirror is polarization dependent.

3. The laser of claim 1 wherein the reflectivity of said second mirror is polarization dependent.

4. The laser of claim 1 wherein said spacer splits the degeneracy of the modes.

5. The laser of claim 1 wherein a polarizing element is provided to split the polarization degeneracy.

6. The laser of claim 1 wherein the degeneracy is split by means for absorbing laser radiation of one polarization mode and transmitting laser radiation of the other polarization mode.

7. The laser of claim 1 wherein said mode degeneracy is split by a birefringement material.

8. The laser of claim 1 wherein said spacer is formed of a semiconductor material and the optical length of said spacer is controlled by an electric field applied to said spacer.

9. The laser of claim 1 wherein the the spacer is birefringement for splitting the degeneracy of said polarization modes.

10. The laser of claim 1 wherein said gain medium is a solid state material.

11. The laser of claim 1 wherein the distance between said first and second mirrors produces a frequency separation of the modes of oscillation in said gain cavity which is less than the gain bandwidth of said gain medium.

12. The laser of claim 1 wherein the polarizing means is a birefringement element.

13. The laser of claim 1 wherein said polarizing means is formed by said spacer.

14. The laser of claim 1 wherein said polarizing means is formed by one of the second and third mirrors.

15. The laser of claim 1 wherein said polarizing means comprises a separate polarizing element.

16. A method of controlling the polarization of laser radiation comprising:
   a) forming a gain cavity comprised of first and second mirrors with a gain medium disposed between the mirrors, such that laser radiation, produced when said medium is pumped, propagates in orthogonal polarization modes corresponding to a given longitudinal mode of said gain cavity and wherein said polarization modes are degenerate and compete with each other for gain;
   b) optically pumping said gain medium to produce said laser radiation;
   c) forming a polarizing cavity comprised of said second mirror and a third partially reflecting mirror with a spacer of controllable optical length disposed between said second and third mirrors and wherein the degeneracy of said orthogonal polarization modes is split in the polarization cavity such that multiple reflections of said radiation occur from said second and third mirrors are superimposed in said gain cavity to obtain a larger net reflectivity of one of said polarization modes than the other, as determined by the optical length of said spacer, such that the polarization mode with the larger reflectivity oscillates before said other polarization mode, thereby depleting the gain for said other polarization mode.

17. The method of claim 16 wherein the reflectivity of said third mirror is polarization dependent and said third mirror splits the degeneracy of said orthogonal polarization modes of the gain cavity.

18. The method of claim 16 wherein the reflectivity of said second mirror is polarization dependent and said second mirror splits the degeneracy of the otherwise degenerate orthogonal polarization modes of said gain cavity.

19. The method of claim 16 wherein said spacer splits the degeneracy of said orthogonal polarization modes of said gain cavity.

20. The method of claim 16 including providing an additional polarizing element which splits the degeneracy of said orthogonal polarization modes of said gain cavity.

21. The method of claim 16 wherein light of one polarization mode is absorbed while light of a second polarization mode is transmitted to split the degeneracy of said orthogonal polarization mode.

22. The method of claim 16 wherein splitting the degeneracy of said orthogonal polarization modes is accomplished by reflecting light of one polarization and transmitting light of a second polarization.

23. The method of claim 16 including providing a birefringent material within said polarizing cavity for splitting the degeneracy of said orthogonal polarization modes.

24. The method of claim 16 wherein said spacer is birefringent and is the means for splitting the degeneracy of said orthogonal polarization modes of said gain cavity.

25. The method of claim 16 including controlling the optical length of said spacer by an electric field applied to electrodes on said spacer.

26. The method of claim 25 wherein said electric field is applied perpendicular to the direction of optical propagation within said spacer.

27. The method of claim 25 wherein said electric field is applied along the direction of optical propagation within said spacer by means of transparent electrodes.

28. The method of claim 25 wherein said electric field is applied along the direction of optical propagation within said spacer by means of opaque electrodes with a hole formed therein to allow light to pass through.

29. The method of claim 16 wherein said spacer is an electro-optic material and the electro-optic effect is used to control the optical length of said spacer for both of said orthogonal polarization modes of said gain cavity.

30. The method of claim 16 wherein said spacer is an electro-optic material and the electro-optic effect is used to control the optical length of said spacer for only one of the orthogonal polarization modes of said gain cavity.

31. The method of claim 16 wherein said spacer is a piezoelectric material and the piezoelectric effect is used to control the optical length of said spacer.

32. The method of claim 16 wherein said spacer is opaque and a hole is formed therein to allow radiation to pass through.

33. The method of claim 16 wherein said spacer is formed of a semiconductor material and the optical length of said spacer is controlled by an electric field applied thereto.

34. The method of claim 33 wherein the electrodes are formed of conductive semiconductor layers grown on said spacer.

35. The method of claim 16 wherein said gain medium is a solid state material.

36. The method of claim 16 wherein the distance between said first and second mirrors produces the frequency separation of the modes of oscillation in said gain cavity which is less than the gain bandwidth of the gain medium.

37. The medium of claim 16 wherein the free spectral range of said polarizing cavity is approximately equal to the longitudinal mode spacing of said gain cavity.

38. The method of claim 16 wherein the spacings between longitudinal modes of said gain cavity are a multiple of the free spectral range of said polarizing cavity.

39. The method of claim 16 wherein the polarization of the laser is changed by changing the frequency of the longitudinal modes of said gain cavity for a spacer in said polarizing cavity of fixed optical length.

40. The method of claim 16 wherein the said gain cavity comprises a microchip laser.

41. A polarizing cavity for reflecting laser radiation comprised of degenerate orthogonally polarized modes of oscillation comprised of first and second partially reflecting mirrors with a spacer of controllable optical length and a splitting means for splitting the degeneracy of said orthogonally polarized modes of radiation between said mirrors, such that the coherent superposition of the reflections from said first and second mirrors results in a larger net reflectivity of one of said split modes than the other to thereby deplete the gain of the other mode, and the polarization mode with the larger net reflectivity is determined by the optical length of said spacer.

42. The cavity of claim 41 wherein the reflectivity of said second mirror is polarization dependent for splitting the degeneracy of said orthogonally polarized modes of light.

43. The cavity of claim 41 wherein the reflectivity of said first mirror is polarization dependent for splitting the degeneracy of said orthogonally polarized modes of radiation.

44. The cavity of claim 41 wherein said spacer splits the degeneracy of said orthogonally polarized modes of radiation.

45. The cavity of claim 41 wherein said splitting means comprises a separate polarizing element for splitting the degeneracy of said orthogonally polarized modes of radiation.

46. The cavity of claim 41 wherein said splitting means absorbs radiation of one polarization and transmits radiation of a second polarization.

47. The cavity of claim 41 wherein said splitting means reflects radiation of one polarization and transmits radiation of a second polarization.

48. The cavity of claim 41 wherein said splitting means is a birefringement material.

49. The cavity of claim 41 wherein said spacer is birefringement.

50. The cavity of claim 41 wherein the optical length of said spacer is controlled by an electric field applied to electrodes on said spacer.

51. The cavity of claim 50 wherein said electric field is applied perpendicular to the direction of optical propagation within said spacer.

52. The cavity of claim 50 wherein said electric field is applied along the direction of optical propagation within said spacer by means of transparent electrodes.

53. The cavity of claim 50 wherein said electric field is applied along the direction of optical propagation within the spacer by means of opaque electrodes with a hold formed therein to allow light to pass through.

54. The cavity of claim 41 wherein said spacer is an electro-optic material and the electro-optic effect is used to control the optical length of said spacer for both of the orthogonally polarized modes of radiation.

55. The cavity of claim 41 wherein said spacer is an electro-optic material and the electro-optic effect is used to control the optical length of said spacer for only one of said orthogonally polarized modes of radiation.

56. The cavity of claim 41 wherein said spacer is a piezoelectric material and the piezoelectric effect is used to control the optical length of said spacer.

57. The cavity of claim 41 wherein said spacer is opaque and a hole is formed therein to allow radiation to pass through.

58. The cavity of claim 44 wherein said spacer is formed of a semiconductor material and the optical length of said spacer is controlled by an electric field applied to said semiconductor material.

59. The cavity of claim 58 wherein said electrodes are formed of conductive semiconductor layers grown on said spacer.

60. In combination:
   a) polarizing cavity for reflecting laser radiation comprised of degenerate orthogonally polarized modes of oscillation comprised of first and second partially reflecting mirrors with a spacer of controllable optical length and a splitting means for splitting the degeneracy of said orthogonally polarized modes of radiation between said mirrors, such that the coherent superposition of the reflections from said first and second mirrors results in a larger net reflectivity for one of said split modes than the other, and the polarization mode with the larger net reflectivity is determined by the optical length of said spacer and b) a laser coupled to said cavity for generating laser radiation incident upon said cavity.

61. The combination of claim 60 wherein the laser is taken from the group comprising single frequency lasers and microchip lasers.

62. The combination of claim 60 wherein the free spectral range of said cavity is equal to the longitudinal mode spacing of said laser.

63. The combination of claim 60 wherein the spacings between longitudinal modes of said laser are a multiple of the free spectral range of said cavity.

64. The combination of claim 60 wherein the polarization of said laser radiation is changed by changing the frequency of the longitudinal modes of the laser for a spacer in said polarizing cavity of fixed optical length.

* * * * *